Sept. 11, 1923.　　　　　　　　　　　　　1,467,507
O. SCHWENGEL
TIME CONTROLLED SWITCH MECHANISM
Filed May 16, 1921
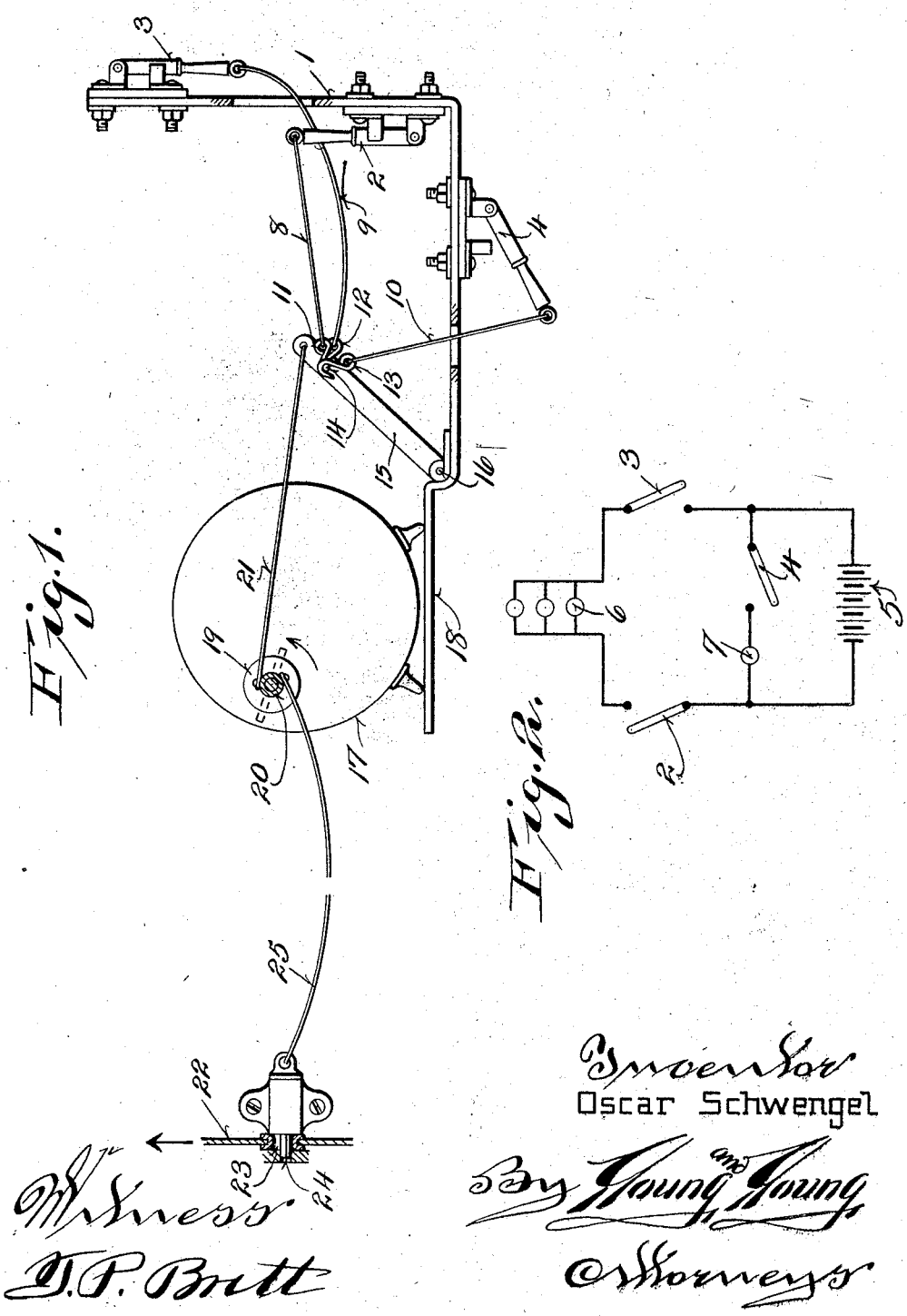
Inventor
Oscar Schwengel Patented Sept. 11, 1923.

1,467,507

UNITED STATES PATENT OFFICE.

OSCAR SCHWENGEL, OF PORT WASHINGTON, WISCONSIN.

TIME-CONTROLLED SWITCH MECHANISM.

Application filed May 16, 1921. Serial No. 470,082.

*To all whom it may concern:*

Be it known that I, OSCAR SCHWENGEL, a citizen of the United States, and resident of Port Washington, in the county of Ozaukee and State of Wisconsin, have invented certain new and useful Improvements in Time-Controlled Switch Mechanism; and I do hereby declare that the following is a full, clear, and exact description thereof.

My invention relates to a new and useful time controlled switch mechanism for automatically turning on and off electric lights at a predetermined time, and in the form which I have illustrated in this application it is peculiarly adapted for use in connection with poultry husbandry.

It is, of course, the desire of every poultry man to obtain the maximum production of eggs in the winter time when they are high priced. When the sun is low, however, and the days are short, fowls are by nature inclined to be inactive and stay on the roost most of the day. In order to stimulate the egg production, it is necessary to increase the activity of the fowls, and it has been authoritatively demonstrated that by providing bright artificial light and plenty of scratch litter they will be kept active, and as a consequence their general condition will be improved and their egg producing organs stimulated.

The general object of my invention is to provide improved means for creating the conditions which have been shown to be conducive to the greatest egg production.

A more specific object of the invention is to provide means of this character which may be controlled automatically at predetermined times so that it will not require the presence of a personal attendant.

With the above and other objects in view, my invention consists of certain details which are illustrated in the accompanying drawing, in which:

Figure 1 is a front elevation of the invention, and

Figure 2 is a diagrammatic view showing the different lighting circuits.

Referring now specifically to the drawings, the numeral 1 indicates a bracket or switchboard which is preferably L-shaped and attached at some convenient point to the building. In the present embodiment of the invention I have provided three switches as indicated at 2, 3 and 4. These switches are interposed in the electric light circuit which extends from the source of electric energy indicated at 5 and supplies current for the bright lights 6 and the dim light 7. The switches are connected by flexible cables 8, 9 and 10 to the hooks 11, 12 and 13 respectively. These hooks may be selectively engaged with a pin 14, which is carried on a radius bar 15 pivotally mounted, as shown at 16, in such a position that by swinging the radius bar the switches which are connected therewith will be operated, that is, the switch 2 will be thrown out and the switches 3 and 4 will be thrown in whenever the radius bar is swung to the left, as shown in Figure 1.

The clock 17 is mounted on the extended portion 18 of the bracket 1. This clock is provided with the usual alarm mechanism 19 which may be set to be tripped at any predetermined time. Extending outwardly from the axis of the alarm mechanism I provide a small windlass or roller 20 which is connected by the flexible member 21 with the end of the radius rod 15.

It is customary in modern poultry houses to provide a curtain in front of the roosts which may be drawn down at night to protect the fowls from the cold, and may be rolled up in the daytime to prevent the fowls from seeking repose. I have shown such a curtain at 22 in Figure 1. This curtain is provided with one or more eyelets 23, which may be engaged with the spring catch 24 to retain the curtain in its lowered position. When the catch is withdrawn the curtain flies up. In the present instance I have connected the spring held catch 24 by a flexible cable 25 to the roller 20.

In carrying out the purpose of my invention after the fowls go to roost at night, the curtain is pulled down, and the alarm set at the proper time, the switch 2 left in and the switches 3 and 4 left out. The hook 12 is then connected with the pin 14. When the time arrives for the fowls to come off from the roost, the alarm goes off, the switch 3 is thrown in, turning on the bright lights, and the curtain is released. The fowls will then leave the roost and start scratching in the litter.

When the attendant comes around in the morning he closes the curtain and disconnects the cable 25 from the roller 20. He then sets the alarm to go off at a time when daylight will be sufficient and connects the hook 11 with the pin 14. When the time arrives, the switch 2 will be thrown out and the lights turned off.

In like manner the device may be set to turn on the lights at the proper time in the afternoon and the last time the attendant comes around to feed the poultry the switches 2 and 3 are left in and the switch 4 is left out and the hooks 11 and 13 connected to the pin 14. The curtain cable 25 is also connected to the roller 20. When the proper time comes for the fowls to go to roost the alarm releases the curtain, throws out the switch 2, turning off the bright lights and throws in the switch 4, so as to turn on the dim light. This dim light is located in a convenient place near the roosts so that the fowls may have sufficient light to go to roost. Later in the evening the attendant comes around and sets the device for morning, as heretofore explained.

From the foregoing description it will be seen that I have provided a device which may be used to automatically set the lights or to release the curtain, and it will only require the presence of the attendant for a few moments at any time in which it is convenient for him to be there.

I claim as my invention:

The combination of a roller secured to the axis of the alarm mechanism of a clock, a horizontal support for said clock, a radius bar pivoted on said support, a flexible member secured at one end to said roller and at the other end to the upper end of said radius bar, a vertical knife switch having an upwardly disposed handle, a flexible member secured at one end to said handle and at the other end to said radius bar adjacent the upper end of said radius bar, said flexible members extending adjacent an approximately straight line connecting the upper end of said handle and said roller, a second knife switch, a third flexible member secured at one end to the handle thereof, said third flexible member being secured at the other end adjacent the upper end of said radius bar, whereby on the rotation of said roller, said knife switches are moved, and a fourth flexible member extending from said roller in the opposite direction to said first mentioned flexible member, a latch plunger secured to said fourth flexible member, and a curtain having an eye receiving said latch plunger, the rotation of said roller tensioning said fourth flexible member and removing said latch plunger from said eye.

In testimony that I claim the foregoing I have hereunto set my hand at Port Washington, in the county of Ozaukee and State of Wisconsin.

OSCAR SCHWENGEL.